(12) United States Patent
Chen (10) Patent No.: US 12,160,847 B2
(45) Date of Patent: Dec. 3, 2024

(54) PAGING METHOD AND APPARATUS, TERMINAL, AND NETWORK SIDE DEVICE

(71) Applicant: VIVO MOBILE COMMUNICATION CO., LTD., Guangdong (CN)

(72) Inventor: Li Chen, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 352 days.

(21) Appl. No.: 17/574,244

(22) Filed: Jan. 12, 2022

(65) Prior Publication Data

US 2022/0141802 A1 May 5, 2022

Related U.S. Application Data

(63) Continuation of application No. PCT/CN2020/106154, filed on Jul. 31, 2020.

(30) Foreign Application Priority Data

Jul. 31, 2019 (CN) .......................... 201910703642.0

(51) Int. Cl.
*H04W 68/02* (2009.01)

(52) U.S. Cl.
CPC .................................. *H04W 68/02* (2013.01)

(58) Field of Classification Search
None
See application file for complete search history.

(56) References Cited

U.S. PATENT DOCUMENTS

| 2017/0142686 A1* | 5/2017 | Zhang ................ H04W 68/025 |
| 2018/0049123 A1 | 2/2018 | Park et al. |
| 2018/0063814 A1 | 3/2018 | Yuan et al. |
| 2018/0084374 A1 | 3/2018 | Jain et al. |
| 2019/0124620 A1* | 4/2019 | Liang .................... H04W 68/00 |
| 2020/0092845 A1 | 3/2020 | Cai et al. |
| 2020/0267533 A1 | 8/2020 | Zhang et al. |
| 2021/0127350 A1 | 4/2021 | Tang |

FOREIGN PATENT DOCUMENTS

| CN | 104469662 A | 3/2015 |
| CN | 105493622 A | 4/2016 |
| CN | 105794286 A | 7/2016 |

(Continued)

OTHER PUBLICATIONS

3rd Generation Partnership Project; Technical Specification Group Radio Access Network; Study on further enhancements to LTE Device to Device (D2D), User Equipment (UE) to network relaysfor Internet of Things (IoT) and wearables; (Release 15), 3GPP TR 36.746, Aug. 2017, V1.1.0, 3GPP, Valbonne, France.

(Continued)

*Primary Examiner* — Frantz Bataille
(74) *Attorney, Agent, or Firm* — IP & T GROUP LLP (57) ABSTRACT

A paging method includes: determining a paging position of the first terminal and the second terminal based on a paging terminal identifier, where the paging terminal identifier is determined based on the first terminal and/or the second terminal; and sending a paging message at the paging position, where the paging message carries a terminal identifier of the first terminal and/or a terminal identifier of the second terminal.

20 Claims, 3 Drawing Sheets

---

Determine a paging position of a first terminal and a second terminal based on a paging terminal identifier, where the paging terminal identifier is determined based on the first terminal and/or the second terminal — 101

Send a paging message at the paging position, where the paging message carries a terminal identifier of the first terminal and/or a terminal identifier of the second terminal — 102

(56) References Cited

FOREIGN PATENT DOCUMENTS

| CN | 108616830 A | 10/2018 |
|---|---|---|
| CN | 109716799 A | 5/2019 |
| CN | 109788494 A | 5/2019 |
| CN | 109792712 A | 5/2019 |
| CN | 109803372 A | 5/2019 |
| CN | 109982262 A | 7/2019 |
| EP | 3491879 | 6/2019 |
| WO | 2016/168829 A1 | 10/2016 |
| WO | 2018/019882 A1 | 2/2018 |
| WO | 2018/223401 A1 | 12/2018 |

OTHER PUBLICATIONS

The First Office Action of Priority Application No. CN 201910703642.0 issued by the Chinese Patent Office on Mar. 2, 2021.
The Second Office Action of Priority Application No. CN 201910703642.0 issued by the Chinese Patent Office on Oct. 11, 2021.
International Search Report and Written Opinion of International Application No. PCT/CN2020/106154 issued by the Chinese Patent Office on Oct. 22, 2020.
Extended European Search Report for the European Patent Application No. 20848023.6 issued by the European Patent Office on Jul. 15, 2022.

* cited by examiner

A first terminal receives a first paging message sent by a network side device, where the first paging message carries a terminal identifier of the first terminal and/or a terminal identifier of a second terminal, a paging position of the first paging message is determined based on a paging terminal identifier, and the paging terminal identifier is determined based on the first terminal and/or the second terminal — 401

PAGING METHOD AND APPARATUS, TERMINAL, AND NETWORK SIDE DEVICE

CROSS-REFERENCE TO RELATED APPLICATIONS

This application is a Bypass Continuation Application of PCT/CN2020/106154 filed on Jul. 31, 2020, which claims priority to Chinese Patent Application No. 201910703642.0 filed on Jul. 31, 2019, which are incorporated herein by reference in their entirety.

TECHNICAL FIELD

The present disclosure relates to the field of communications technologies, and in particular, to a paging method and apparatus, a terminal, and a network side device.

BACKGROUND

When a wearable device (for example, a watch, a headset, a pair of glasses, or a band) is connected to another terminal device (for example, a mobile phone, a personal computer, a notebook computer, or a hand-held computer) in a non-cellular direct connection manner (for example, Bluetooth (BT), WiFi, near field communication, device to device, or vehicle-to-vehicle communication), a network side device pages the terminal device, and the terminal device notifies the wearable device in a non-cellular direct connection manner.

When the wearable device is connected to a network side device through a cellular network, the network side device needs to page the terminal device and the wearable device at the same time.

SUMMARY

According to a first aspect, an embodiment of the present disclosure provides a paging method, applied to a network side device, used to page a first terminal and/or a second terminal, and including:
  determining a paging position of the first terminal and the second terminal based on a paging terminal identifier, where the paging terminal identifier is determined based on the first terminal and/or the second terminal; and
  sending a paging message at the paging position, where the paging message carries a terminal identifier of the first terminal and/or a terminal identifier of the second terminal.

According to a second aspect, an embodiment of the present disclosure provides a paging method, applied to a first terminal, where in a case where the first terminal resides in a cellular network, communicates with a cellular network device, or is in an inactive state in a cellular network, the method includes:
  receiving, by the first terminal, a first paging message sent by a network side device, where the first paging message carries a terminal identifier of the first terminal and/or a terminal identifier of the second terminal, a paging position of the first paging message is determined based on a paging terminal identifier, and the paging terminal identifier is determined based on the first terminal and/or the second terminal.

According to a third aspect, an embodiment of the present disclosure provides a paging apparatus, applied to a network side device, and including:
  a processing module, configured to determine a paging position of a first terminal and a second terminal based on a paging terminal identifier, where the paging terminal identifier is determined based on the first terminal and/or the second terminal; and
  a sending module, configured to send a paging message at the paging position, where the paging message carries a terminal identifier of the first terminal and/or a terminal identifier of the second terminal.

According to a fourth aspect, an embodiment of the present disclosure further provides a paging apparatus, applied to a first terminal, and including:
  a receiving module, configured to receive a first paging message sent by a network side device, where the first paging message carries a terminal identifier of the first terminal and/or a terminal identifier of a second terminal, a paging position of the first paging message is determined based on a paging terminal identifier, and the paging terminal identifier is determined based on the first terminal and/or the second terminal.

According to a fifth aspect, an embodiment of the present disclosure further provides a communications device, where the communications device includes a processor, a memory, and a computer program stored in the memory and executable on the processor, and when the computer program is executed by the processor, steps of the foregoing paging method are implemented.

According to a sixth aspect, an embodiment of the present disclosure further provides a non-transitory computer-readable storage medium, where the non-transitory computer-readable storage medium stores a computer program, and when the computer program is executed by a processor, steps of the foregoing paging method are implemented.

DESCRIPTION OF DRAWINGS

To describe the technical solutions of the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings.

DETAILED DESCRIPTION OF EMBODIMENTS

Exemplary embodiments of the present disclosure will be described below with reference to the accompanying drawings. Although the accompanying drawings show exemplary embodiments of the present disclosure, it should be understood that the present disclosure can be implemented in various forms and shall not be limited by embodiments described herein. On the contrary, the embodiments are provided to enable more thorough understanding of the present disclosure and convey the scope of the present disclosure to a person skilled in the art.

Terms "first", "second", and the like in the specification and claims of the present application are used to distinguish between similar objects, instead of describing a specific sequence or order. It should be understood that the data used in such a way is interchangeable in proper circumstances, so that the embodiments of the present application described herein can be implemented in an order other than the order illustrated or described herein. In addition, terms "include", "have", and any variants thereof are intended to cover non-exclusive inclusion, for example, processes, methods, systems, products, or devices that include a series of steps or units are not necessarily limited to those steps or units that are clearly listed, but may include other steps or units that are not clearly listed or are inherent to these processes, methods, products, or devices. "And/or" used in the specification and claims means at least one of the connected objects.

The technology described in this specification is not limited to a Long Term Evolution (LTE)/LTE-Advanced (LTE-A) system, and may also be used in various wireless communications systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA), and another system. The terms "system" and "network" are usually used interchangeably. The CDMA system can implement radio technologies such as CDMA2000 and universal terrestrial radio access (UTRA). UTRA includes wideband CDMA (WCDMA) and other CDMA variants. The TDMA system can implement a radio technology such as Global System for Mobile Communication (GSM). The OFDMA system can implement radio technologies such as Ultra Mobile Broadband (UMB), evolved-UTRA (E-UTRA), IEEE 802.11 (Wi-Fi), IEEE 802.16 (WiMAX), IEEE 802.20, and Flash-OFDM. UTRA and E-UTRA are parts of the Universal Mobile Telecommunications System (UMTS). LTE and more advanced LTE (such as LTE-A) are new UMTS versions that use E-UTRA. UTRA, E-UTRA, UMTS, LTE, LTE-A and GSM are described in documents from an organization named "3rd generation partnership project (3GPP)". CDMA2000 and UMB are described in a document from an origination named "3rd Generation Partnership Project 2" (3GPP2). The technology described in this specification may be used in the foregoing system and radio technology, and may also be used in another system and radio technology. However, an NR system is described in the following description for illustrative purposes, and an NR terminology is used in most of the following description, although these technologies can also be applied to applications other than the NR system application.

The following description provides examples and does not limit the scope, applicability, or configuration set forth in the claims. Changes may be made to the function and arrangement of discussed elements without deviating from the spirit and scope of this present disclosure. In various examples, various procedures or components may be omitted, replaced, or added appropriately. For example, the described method may be executed based on a sequence different from the description, and various steps may be added, omitted, or combined. In addition, features described with reference to some examples may be combined in other examples.

When a wearable device (for example, a watch, a headset, a pair of glasses, or a band) is connected to another terminal device (for example, a mobile phone, a personal computer, a notebook computer, or a hand-held computer) in a non-cellular direct connection manner (for example, Bluetooth (BT), WiFi, near field communication (Sidelink), device to device (D2D), or vehicle-to-vehicle communication (V2X/V2V/V2I)), a network side device pages the terminal device, and the terminal device notifies the wearable device in a non-cellular direct connection manner.

When the wearable device is connected to a network side device through a cellular network, the network side device needs to page the terminal device and the wearable device at the same time.

In a Long Term Evolution (LTE) or new radio (NR) system, a discontinuous reception (DRX) period is introduced to reduce power consumption of a terminal (UE). The UE monitors a physical downlink control channel (PDCCH) only at a position that corresponds to a paging frame (PF) and a paging occasion (PO) that are calculated based on a terminal identifier (UE_ID) and network side configuration information, to receive a paging message on a resource indicated by the PDCCH. The UE_ID is an international mobile subscriber identity (IMSI) in LTE, and is a SAE-temporary mobile subscriber identity (S-TMSI) in NR.

In a case where the UE is in an idle state, because the network side does not learn a position of the UE, when needing to paging the terminal, a core network may send the paging message to the UE through all base stations in a particular range (for example, an area smaller than or equal to a tracking area).

Usually, a wearable terminal and another terminal device associated with the wearable terminal are separately paged, but it cannot be ensured that the wearable terminal and the associated terminal device are paged at the same time. In addition, a network side determines a monitoring position based on a UE_ID, to page the terminal. Because the wearable device and another terminal device have different UE_IDs, the following case may exist: one terminal has responded but the other terminal has not received a paging message; or one terminal has not answered paging, and the other terminal is not paged, leading to a difference between user experience.

To solve the foregoing problem, embodiments of the present disclosure provide a paging method and apparatus, a terminal, and a network side device, to page a first terminal and a second terminal at a same moment, thereby improving user experience.

Figure 1:
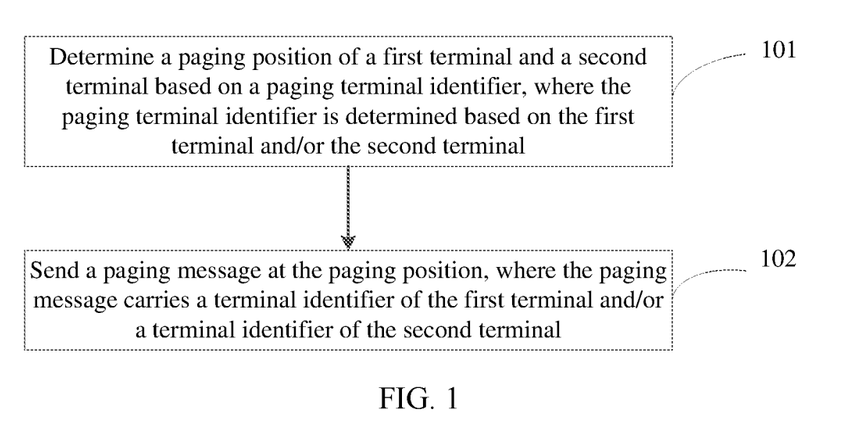
FIG. 1 is a schematic flowchart of a paging method applied to a network side device according to an embodiment of the present disclosure.

An embodiment of the present disclosure provides a paging method, applied to a network side device. As shown in FIG. 1, the method may include the following steps:

Step 101. Determine a paging position of a first terminal and a second terminal based on a paging terminal identifier, where the paging terminal identifier is determined based on the first terminal and/or the second terminal.

Step 102. Send a paging message at the paging position, where the paging message carries a terminal identifier of the first terminal and/or a terminal identifier of the second terminal.

In this embodiment, the network side device determines the paging position of the first terminal and the second terminal by using the paging terminal identifier, where the paging terminal identifier is determined based on the first terminal and/or the second terminal. The network side device sends the paging message at the determined paging position, where the paging message carries the terminal identifier of the first terminal and/or the terminal identifier of the second terminal. In this way, it can be ensured that the first terminal and the second terminal are paged at the same time, and when the first terminal or the second terminal is a wearable device, experience of a user wearing the wearable device can be effectively improved.

There is only one paging terminal identifier, and the paging terminal identifier may be determined based on the first terminal, or may be determined based on the second terminal, or may be determined based on the first terminal and the second terminal.

In this embodiment, the first terminal or the second terminal is connected to a cellular network. The cellular network includes the 2nd generation (2G) mobile communications network, the 3rd generation (3G) mobile communications network, the 4th generation (4G) mobile communications network, the 5th generation (5G) mobile communications network, and a future evolved cellular communications system.

The first terminal may be a wearable device (for example, a watch, a headset, a pair of glasses, or a band), and the second terminal may be another terminal device (for example, a mobile phone, a personal computer, a notebook computer, or a handheld computer), or the second terminal may be a wearable device (for example, a watch, a headset, a pair of glasses, or a band), and the first terminal may be another terminal device (for example, a mobile phone, a personal computer, a notebook computer, or a handheld computer).

When the first terminal is a wearable device, and the second terminal is another terminal device, or the second terminal is a wearable device, and the first terminal is another terminal device, a correspondence between the wearable device and another terminal device may be: different subscriber identity module cards using a same number; different terminals using a same number; the wearable device using a universal subscriber identity module card, and another terminal device using an embedded subscriber identity module card; using different numbers; and using two numbers having a binding relationship.

In this embodiment, the paging message sent by the network side device may include only the terminal identifier of the first terminal, or include only the terminal identifier of the second terminal, or include both the terminal identifier of the first terminal and the terminal identifier of the second terminal. The paging message sent by the network side device may be received only by the first terminal, or only by the second terminal, or by both the first terminal and the second terminal.

Optionally, the paging position includes at least one of:
a time-domain position, namely, a paging frame (PF);
a time-domain position, namely, a paging occasion (PO); or
a frequency-domain position: a carrier, a bandwidth, or a bandwidth part (BWP) used to transmit the paging message.

Optionally, the first terminal resides in a cellular network, or communicates with a cellular network device, or is in an inactive state in a cellular network; and
the second terminal communicates with the network side device through a cellular network, or the first terminal and the second terminal communicate with each other through a non-cellular network.

The paging terminal identifier may be any one of:
the terminal identifier of the first terminal;
the terminal identifier of the second terminal; or
a primary terminal identifier of the first terminal and the second terminal, where the primary terminal identifier is the terminal identifier of the first terminal, the terminal identifier of the second terminal, or a preset identifier.

In an embodiment, there is a binding relationship between the first terminal and the second terminal, and the method further includes:
obtaining the binding relationship between the first terminal and the second terminal from a core network entity such as an Internet protocol multimedia subsystem (IMS). In this way, based on the technical solutions of this embodiment, a plurality of terminals having a binding relationship can be paged at the same time. That there is a binding relationship between terminals means that there is a binding relationship between terminal IDs, or there is a binding relationship between subscriber identity module cards (SIM), embedded SIM cards (eSIM), universal subscriber identity module cards (USIM), or corresponding numbers of the terminals.

In this embodiment, when the network side device can page only the first terminal or the second terminal, a terminal that the network side device pages may be set by a user or configured by the network side device, and the terminal that the network side device pages is determined based on the binding relationship between the first terminal and the second terminal.

Optionally, to facilitate the network side device in determining the paging position, the method further includes:
assigning a same terminal identifier or similar terminal identifiers, for example, a SAE-temporary mobile subscriber identity (S-TMSI), to the first terminal and the second terminal.

To accurately page the terminal, before the paging message is sent, the method further includes:
obtaining at least one of:
paging information of the first terminal; or
paging information of the second terminal.

Optionally, the paging information of the first terminal or the paging information of the second terminal includes at least one of:
the terminal identifier of the first terminal;
application layer configuration information of the first terminal;
access stratum configuration information of the first terminal;
the terminal identifier of the second terminal;
application layer configuration information of the second terminal; or
access stratum configuration information of the second terminal.

Optionally, the application layer configuration information includes an IP layer identifier; and
the access stratum configuration information includes an access network side identifier.

Optionally, the paging information is obtained through at least one of:
receiving the paging information of the first terminal and/or the paging information of the second terminal reported by the first terminal;
receiving the paging information of the first terminal and/or the paging information of the second terminal reported by the second terminal; or obtaining paging information of the first terminal and/or paging information of the second terminal from a core network entity.

Optionally, the terminal identifier includes some or all bits of at least one of:
an international mobile equipment identity (IMEI);
an international mobile subscriber identity (IMSI);
a SAE-temporary mobile subscriber identity (S-TMSI); or
a radio network temporary identifier (RNTI).

The paging method applied to the network side device is described in detail in the foregoing embodiment. A corresponding paging apparatus and a network side device are described in the following embodiment with reference to the accompanying drawings.

Figure 2:
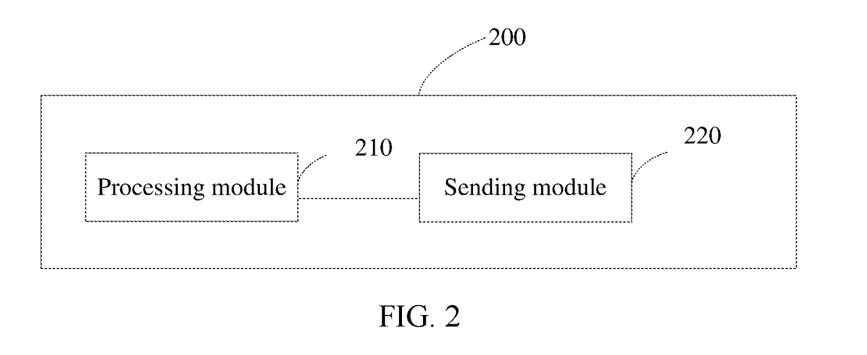
FIG. 2 is a schematic structural diagram of modules of a network side device according to an embodiment of the present disclosure.

As shown in FIG. 2, a paging apparatus 200 in an embodiment of the present disclosure can implement the paging method in the foregoing embodiment, and achieve the same effect. The paging apparatus 200 includes the following functional modules:
a processing module 210, configured to determine a paging position of a first terminal and a second terminal based on a paging terminal identifier, where the paging terminal identifier is determined based on the first terminal and/or the second terminal; and
a sending module 220, configured to send a paging message at the paging position, where the paging message carries a terminal identifier of the first terminal and/or a terminal identifier of the second terminal.

In this embodiment, the network side device determines the paging position of the first terminal and the second terminal by using the paging terminal identifier, where the paging terminal identifier is determined based on the first terminal and/or the second terminal. The network side device sends the paging message at the determined paging position, where the paging message carries the terminal identifier of the first terminal and/or the terminal identifier of the second terminal. In this way, it can be ensured that the first terminal and the second terminal are paged at the same time, and when the first terminal or the second terminal is a wearable device, experience of a user wearing the wearable device can be effectively improved.

The first terminal may be a wearable device (for example, a watch, a headset, a pair of glasses, or a band), and the second terminal may be another terminal device (for example, a mobile phone, a personal computer, a notebook computer, or a handheld computer), or the second terminal may be a wearable device (for example, a watch, a headset, a pair of glasses, or a band), and the first terminal may be another terminal device (for example, a mobile phone, a personal computer, a notebook computer, or a handheld computer).

When the first terminal is a wearable device, and the second terminal is another terminal device, or the second terminal is a wearable device, and the first terminal is another terminal device, a correspondence between the wearable device and another terminal device may be: different subscriber identity module cards using a same number; different terminals using a same number; the wearable device using a universal subscriber identity module card, and another terminal device using an embedded subscriber identity module card; using different numbers; and using two numbers having a binding relationship.

Optionally, the paging position includes at least one of:
a time-domain position, namely, a paging frame (PF);
a time-domain position, namely, a paging occasion (PO); or
a frequency-domain position: a carrier, a bandwidth, or a bandwidth part (BWP) used to transmit the paging message.

Optionally, the first terminal resides in a cellular network, or communicates with a cellular network device, or is in an inactive state in a cellular network; and
the second terminal communicates with the network side device through a cellular network, or the first terminal and the second terminal communicate with each other through a non-cellular network.

The paging terminal identifier may be any one of:
the terminal identifier of the first terminal;
the terminal identifier of the second terminal; or
a primary terminal identifier of the first terminal and the second terminal, where the primary terminal identifier is the terminal identifier of the first terminal, the terminal identifier of the second terminal, or a preset identifier.

In an embodiment, there is a binding relationship between the first terminal and the second terminal, and the apparatus further includes:
an obtaining module, configured to obtain the binding relationship between the first terminal and the second terminal from a core network entity such as an IP multimedia subsystem (IMS). In this way, based on the technical solutions of this embodiment, a plurality of terminals having a binding relationship can be paged at the same time. That there is a binding relationship between terminals means that there is a binding relationship between terminal IDs, or there is a binding relationship between subscriber identity module cards (SIM), embedded SIM cards (eSIM), universal subscriber identity module cards (USIM), or corresponding numbers of the terminals.

Optionally, to facilitate the network side device in determining the paging position, the apparatus further includes:
an assigning module, configured to assign a same terminal identifier or similar terminal identifiers, for example, a SAE-temporary mobile subscriber identity (S-TMSI), to the first terminal and the second terminal.

To accurately page the terminal, before the paging message is sent, the obtaining module is further configured to obtain at least one of:
paging information of the first terminal; or
paging information of the second terminal.

Optionally, the paging information of the first terminal or the paging information of the second terminal includes at least one of:
the terminal identifier of the first terminal;
application layer configuration information of the first terminal;
access stratum configuration information of the first terminal;
the terminal identifier of the second terminal;
application layer configuration information of the second terminal; or
access stratum configuration information of the second terminal.

Optionally, the application layer configuration information includes an IP layer identifier; and
the access stratum configuration information includes an access network side identifier.

Optionally, the paging information is obtained through at least one of:
receiving the paging information of the first terminal and/or the paging information of the second terminal reported by the first terminal;

receiving the paging information of the first terminal and/or the paging information of the second terminal reported by the second terminal; or obtaining the paging information of the first terminal and/or the paging information of the second terminal from a core network entity.

Optionally, the terminal identifier includes some or all bits of at least one of:

an international mobile equipment identity (IMEI);
an international mobile subscriber identity (IMSI);
a SAE-temporary mobile subscriber identity (S-TMSI); or
a radio network temporary identifier (RNTI).

It should be noted that division of the modules of the paging apparatus is merely logical function division, and in actual implementation, the modules may be all or partially integrated into one physical entity, or may be physically separated. In addition, these modules may all be implemented in the form of software being invoked by processing elements; or may all be implemented in the form of hardware; or some of the modules may be implemented in the form of software being invoked by processing elements, and some of the modules may be implemented in the form of hardware. For example, the processing module may be a separately disposed processing element, or may be integrated into a chip of the foregoing apparatus for implementation. In addition, the processing module may also be stored in the memory of the foregoing apparatus in a form of program code, and a processing element of the foregoing apparatus invokes and executes the functions of the foregoing processing module. The implementations of other modules are similar thereto. In addition, all or some of these modules may be integrated together or implemented independently. The processing element herein may be an integrated circuit having a signal processing capability. During an implementation process, various steps of the foregoing method or the foregoing modules may be completed through an integrated logic circuit of the hardware in the processor element or a command in a form of software.

For example, the modules may be configured as one or more integrated circuits for implementing the foregoing method, for example, one or more application specific integrated circuits (ASIC), one or more microprocessors (DSP), or one or more field programmable gate arrays (FPGA). For another example, when a module above is implemented by invoking program code by using a processing element, the processing element may be a general-purpose processor, for example, a central processing unit (CPU) or another processor that can invoke program code. For another example, these modules may be integrated together, and implemented in a form of a system-on-a-chip (SOC).

To better achieve the foregoing objective, an embodiment of the present disclosure further provides a network side device, including a processor, a memory, and a computer program stored in the memory and executable on the processor, where when the computer program is executed by the processor, steps of the foregoing paging method are implemented.

Figure 3:
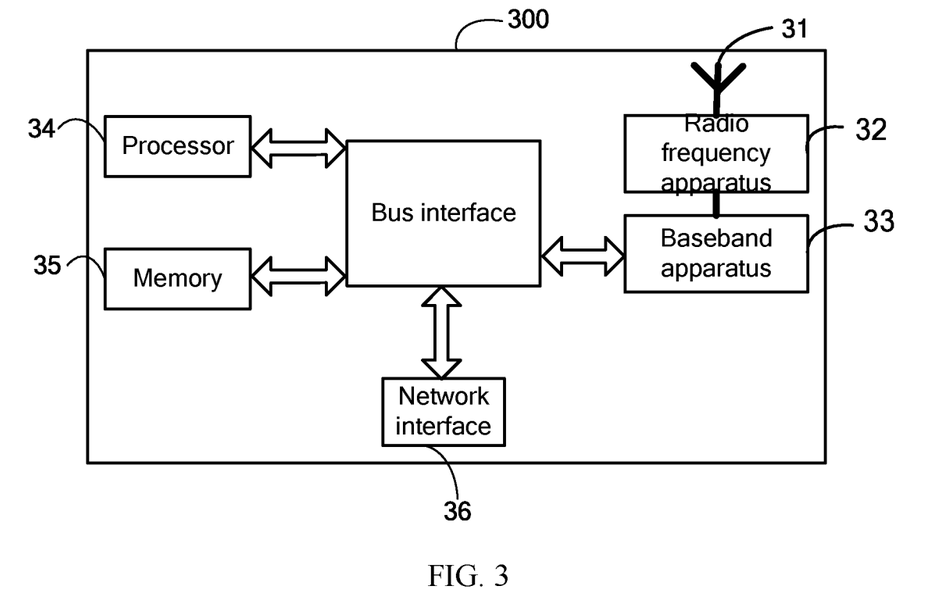
FIG. 3 is a block diagram of a network side device according to an embodiment of the present disclosure.

For example, the embodiments of the present disclosure further provide a network side device. As shown in FIG. 3, the network side device 300 includes an antenna 31, a radio frequency apparatus 32, and a baseband apparatus 33. The antenna 31 is connected to the radio frequency apparatus 32. In an uplink direction, the radio frequency apparatus 32 receives information through the antenna 31, and sends the received information to the baseband apparatus 33 for processing. In a downlink direction, the baseband apparatus 33 processes information to be sent and sends the information to the radio frequency apparatus 32, and the radio frequency apparatus 32 processes the received information and then sends the information through the antenna 31.

The foregoing paging apparatus 200 may be located in the baseband apparatus 33, and the method performed by the network side device in the foregoing embodiment may be implemented in the baseband apparatus 33. The baseband apparatus 33 includes a processor 34 and a memory 35.

The baseband apparatus 33 may include, for example, at least one baseband board, and a plurality of chips are arranged on the baseband board. As shown in FIG. 3, one of the chips is, for example, the processor 34, and is connected to the memory 35, to invoke a program in the memory 35, so as to perform the operations of the network side device shown in the foregoing method embodiment.

The baseband apparatus 33 may further include a network interface 36, configured to exchange information with the radio frequency apparatus 32. For example, the interface is a common public radio interface (CPRI).

The processor herein may be a single processor, or may be a collective term for a plurality of processing elements. For example, the processor may be a CPU or an ASIC, or may be one or more integrated circuits that are configured to implement the foregoing method performed by the network side device, for example, may be one or more microprocessors DSPs, or one or more field programmable gate arrays FPGAs. The storage element may be one memory or a collective term for a plurality of storage elements.

The memory 35 may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example rather than limitative description, RAMs in many forms may be used, for example, a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchlink dynamic random access memory (SLDRAM), and a direct rambus random access memory (DRRAM). The memory 35 described in the present application is intended to include but is not limited to these and any other suitable types of memories.

For example, the network side device in this embodiment of the present disclosure further includes a computer program stored in the memory 35 and executable on the processor 34, and the processor 34 invokes the computer program in the memory 35 to perform the method performed by the modules shown in FIG. 2.

For example, when invoked by the processor 34, the computer program may be used to perform the following operations: determining a paging position of a first terminal and a second terminal by using a paging terminal identifier, where the paging terminal identifier is determined based on the first terminal and/or the second terminal; and sending a paging message at the paging position, where the paging message carries a terminal identifier of the first terminal and/or a terminal identifier of the second terminal.

The first terminal may be a wearable device (for example, a watch, a headset, a pair of glasses, or a band), and the second terminal may be another terminal device (for example, a mobile phone, a personal computer, a notebook computer, or a handheld computer), or the second terminal may be a wearable device (for example, a watch, a headset, a pair of glasses, or a band), and the first terminal may be another terminal device (for example, a mobile phone, a personal computer, a notebook computer, or a handheld computer).

When the first terminal is a wearable device, and the second terminal is another terminal device, or the second terminal is a wearable device, and the first terminal is another terminal device, a correspondence between the wearable device and another terminal device may be: different subscriber identity module cards using a same number; different terminals using a same number; the wearable device using a universal subscriber identity module card, and another terminal device using an embedded subscriber identity module card; using different numbers; and using two numbers having a binding relationship.

Optionally, the paging position includes at least one of:
a time-domain position, namely, a paging frame (PF);
a time-domain position, namely, a paging occasion (PO); or
a frequency-domain position: a carrier, a bandwidth, or a bandwidth part (BWP) used to transmit the paging message.

Optionally, the first terminal resides in a cellular network, or communicates with a cellular network device, or is in an inactive state in a cellular network; and
the second terminal communicates with the network side device through a cellular network, or the first terminal and the second terminal communicate with each other through a non-cellular network.

The paging terminal identifier may be any one of:
the terminal identifier of the first terminal;
the terminal identifier of the second terminal; or
a primary terminal identifier of the first terminal and the second terminal, where the primary terminal identifier is the terminal identifier of the first terminal, the terminal identifier of the second terminal, or a preset identifier.

In an embodiment, there is a binding relationship between the first terminal and the second terminal, and when invoked by the processor 34, the computer program may be used to perform the following operations:
obtaining the binding relationship between the first terminal and the second terminal from a core network entity such as an IP multimedia subsystem (IMS). In this way, based on the technical solutions of this embodiment, a plurality of terminals having a binding relationship can be paged at the same time. That there is a binding relationship between terminals means that there is a binding relationship between terminal IDs, or there is a binding relationship between subscriber identity module cards (SIM), embedded SIM cards (eSIM), universal subscriber identity module cards (USIM), or corresponding numbers of the terminals.

Optionally, to facilitate the network side device in determining the paging position, when being invoked by the processor 34, the computer program may be used to perform the following operation:
assigning a same terminal identifier or similar terminal identifiers, for example, a SAE-temporary mobile subscriber identity (S-TMSI), to the first terminal and the second terminal.

To accurately page the terminal, before the paging message is sent, when being invoked by the processor 34, the computer program may be used to perform the following operation:
obtaining at least one of:
paging information of the first terminal; or
paging information of the second terminal.

Optionally, the paging information of the first terminal or the paging information of the second terminal includes at least one of:
the terminal identifier of the first terminal;
application layer configuration information of the first terminal;
access stratum configuration information of the first terminal;
the terminal identifier of the second terminal;
application layer configuration information of the second terminal; or
access stratum configuration information of the second terminal.

Optionally, the application layer configuration information includes an IP layer identifier; and
the access stratum configuration information includes an access network side identifier.

Optionally, the paging information is obtained through at least one of:
receiving the paging information of the first terminal and/or the paging information of the second terminal reported by the first terminal;
receiving the paging information of the first terminal and/or the paging information of the second terminal reported by the second terminal; or
obtaining the paging information of the first terminal and/or the paging information of the second terminal from a core network entity.

Optionally, the terminal identifier includes some or all bits of at least one of:
an international mobile equipment identity (IMEI);
an international mobile subscriber identity (IMSI);
a SAE-temporary mobile subscriber identity (S-TMSI); or
a radio network temporary identifier (RNTI).

Figure 4:
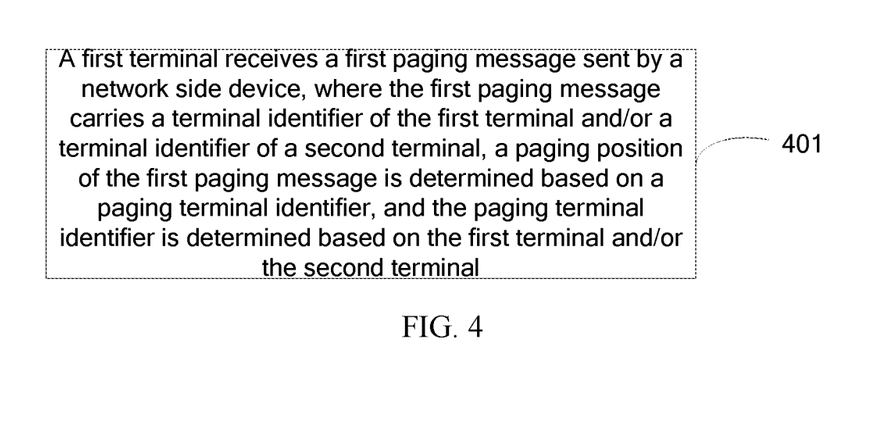
FIG. 4 is a schematic flowchart of a paging method applied to a terminal according to an embodiment of the present disclosure.

An embodiment of the present disclosure further provides a paging method, applied to a first terminal, where in a case where the first terminal resides in a cellular network, communicates with a cellular network device, or is in an inactive state in a cellular network, as shown in FIG. 4, the method includes:

Step 401. The first terminal receives a first paging message sent by a network side device, where the first paging message carries a terminal identifier of the first terminal and/or a terminal identifier of a second terminal, a paging position of the first paging message is determined based on a paging terminal identifier, and the paging terminal identifier is determined based on the first terminal and/or the second terminal.

In this embodiment, the network side device sends the paging message at the determined paging position, where the paging message carries the terminal identifier of the first terminal and/or the terminal identifier of the second terminal. In this way, it can be ensured that the first terminal and the second terminal are paged at the same time, and when the first terminal or the second terminal is a wearable device, experience of a user wearing the wearable device can be effectively improved.

In this embodiment, the first terminal or the second terminal is connected to a cellular network. The cellular network includes the 2nd generation (2G) mobile communications network, the 3rd generation (3G) mobile communications network, the 4th generation (4G) mobile communications network, the 5th generation (5G) mobile communications network, and a future evolved cellular communications system.

The first terminal may be a wearable device (for example, a watch, a headset, a pair of glasses, or a band), and the second terminal may be another terminal device (for example, a mobile phone, a personal computer, a notebook computer, or a handheld computer), or the second terminal may be a wearable device (for example, a watch, a headset, a pair of glasses, or a band), and the first terminal may be another terminal device (for example, a mobile phone, a personal computer, a notebook computer, or a handheld computer).

When the first terminal is a wearable device, and the second terminal is another terminal device, or the second terminal is a wearable device, and the first terminal is another terminal device, a correspondence between the wearable device and another terminal device may be: different subscriber identity module cards using a same number; different terminals using a same number; the wearable device using a universal subscriber identity module card, and another terminal device using an embedded subscriber identity module card; using different numbers; and using two numbers having a binding relationship.

Optionally, the paging position includes at least one of:
a time-domain position, namely, a paging frame (PF);
a time-domain position, namely, a paging occasion (PO); or
a frequency-domain position: a carrier, a bandwidth, or a bandwidth part (BWP)
used to transmit the paging message.

Optionally, the second terminal communicates with the network side device through a cellular network, or
the first terminal and the second terminal communicate with each other through a non-cellular network.

Optionally, in a case where the first terminal and the second terminal communicate with each other through a non-cellular network, the method further includes:
sending, by the first terminal, the first paging message to the second terminal through the non-cellular network.

Optionally, the method further includes:
receiving, by the second terminal, the first paging message sent by the network side device, where the first paging message carries the terminal identifier of the first terminal and/or the terminal identifier of the second terminal, the paging position of the first paging message is determined based on the paging terminal identifier, and the paging terminal identifier is determined based on the first terminal and/or the second terminal.

When the first terminal receives the first paging message of the network side device, the second terminal may also receive the first paging message of the network side device. In this case, the terminal identifier in the first paging message received by the first terminal may be the same as the terminal identifier in the first paging message received by the second terminal.

The paging terminal identifier may be any one of:
the terminal identifier of the first terminal;
the terminal identifier of the second terminal; or
a primary terminal identifier of the first terminal and the second terminal, where the primary terminal identifier is the terminal identifier of the first terminal, the terminal identifier of the second terminal, or a preset identifier.

To facilitate the network side device in determining the paging position, the terminal identifier of the first terminal and the terminal identifier of the second terminal are a same terminal identifier or similar terminal identifiers assigned by the network side device.

Optionally, there is a binding relationship between the first terminal and the second terminal. In this way, based on the technical solutions of this embodiment, a plurality of terminals having a binding relationship can be paged at the same time. That there is a binding relationship between terminals means that there is a binding relationship between terminal IDs, or there is a binding relationship between subscriber identity module cards (SIM), embedded SIM cards (eSIM), universal subscriber identity module cards (USIM), or corresponding numbers of the terminals.

In this embodiment, in a case where there is a binding relationship between the first terminal and the second terminal, when the network side device sends the first paging message, the first paging message may be received only by the first terminal, or only by the second terminal, or by both the first terminal and the second terminal. In a case where the network side device pages only the first terminal or the second terminal, a terminal that the network side device pages may be set by a user or configured by the network side device, and the terminal that the network side device pages is determined based on the binding relationship between the first terminal and the second terminal.

A paging terminal identifier used by the first terminal to determine the paging position is the same as a paging terminal identifier used by the second terminal to determine the paging position.

Optionally, in a case where the second terminal resides in a cellular network, communicates with a cellular network device, or is in an inactive state in a cellular network, the first terminal is a terminal that is determined by the network side and that receives the first paging message.

Optionally, in a case where the second terminal resides in a cellular network, communicates with a cellular network device, or is in an inactive state in a cellular network, the second terminal does not receive the first paging message or the second terminal receives a second paging message sent by the network side device to the second terminal. For example, the first paging message may carry the terminal identifier of the first terminal and the second paging message may carry the terminal identifier of the second terminal.

Optionally, to accurately page the terminal, before the first terminal receives the paging message sent by the network side device, the method further includes:
sending, by the first terminal, paging information of the first terminal and/or paging information of the second terminal to the network side device.

Optionally, to accurately page the terminal, the method further includes:
sending, by the second terminal, paging information of the first terminal and/or paging information of the second terminal to the network side device.

Optionally, the paging information of the first terminal or the paging information of the second terminal includes at least one of:
the terminal identifier of the first terminal;
application layer configuration information of the first terminal;
access stratum configuration information of the first terminal;
the terminal identifier of the second terminal;
application layer configuration information of the second terminal;

access stratum configuration information of the second terminal.
capability information of the first terminal; or
capability information of the second terminal.

Optionally, the application layer configuration information includes an IP layer identifier; and
the access stratum configuration information includes an access network side identifier.

When the first terminal sends the paging information of the second terminal to the network side device, before the first terminal sends the paging information of the second terminal to the network side device, the method further includes:
obtaining, by the first terminal, the paging information of the second terminal.

Optionally, the first terminal obtains the paging information of the second terminal through at least one of:
receiving, by the first terminal, the paging information of the second terminal sent by the second terminal through a non-cellular network; or
receiving, by the first terminal, the paging information of the second terminal sent by the network side device through a cellular network.

Optionally, the terminal identifier includes some or all bits of at least one of:
an international mobile equipment identity (IMEI);
an international mobile subscriber identity (IMSI);
a SAE-temporary mobile subscriber identity (S-TMSI); or
a radio network temporary identifier (RNTI).

The paging method applied to the first terminal is described in detail in the foregoing embodiment. A corresponding paging apparatus and a terminal are described in the following embodiment with reference to the accompanying drawings.

Figure 5:
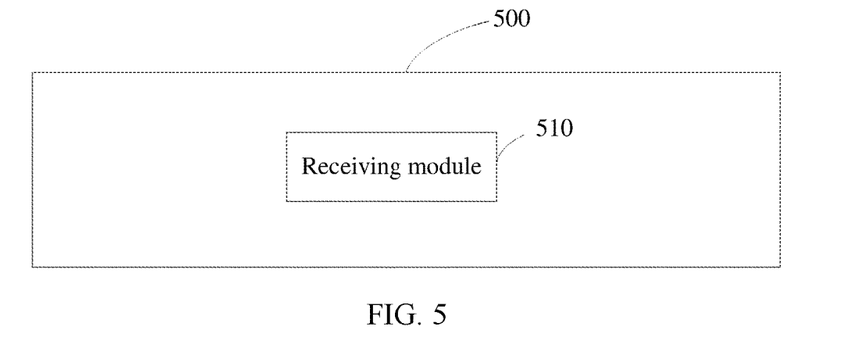
FIG. 5 is a schematic structural diagram of modules of a terminal according to an embodiment of the present disclosure.

As shown in FIG. 5, a paging apparatus 500 in an embodiment can implement the paging method in the foregoing embodiment, and achieve the same effect. The paging apparatus 500 includes the following functional modules:
a receiving module 510, configured to receive a first paging message sent by a network side device, where the first paging message carries a terminal identifier of a first terminal and/or a terminal identifier of a second terminal, a paging position of the first paging message is determined based on a paging terminal identifier, and the paging terminal identifier is determined based on the first terminal and/or the second terminal.

In this embodiment, the network side device sends the paging message at the determined paging position, where the paging message carries the terminal identifier of the first terminal and/or the terminal identifier of the second terminal. In this way, it can be ensured that the first terminal and the second terminal are paged at the same time, and when the first terminal or the second terminal is a wearable device, experience of a user wearing the wearable device can be effectively improved.

The paging apparatus 500 in this embodiment is applied to the first terminal.

The first terminal may be a wearable device (for example, a watch, a headset, a pair of glasses, or a band), and the second terminal may be another terminal device (for example, a mobile phone, a personal computer, a notebook computer, or a handheld computer), or the second terminal may be a wearable device (for example, a watch, a headset, a pair of glasses, or a band), and the first terminal may be another terminal device (for example, a mobile phone, a personal computer, a notebook computer, or a handheld computer).

When the first terminal is a wearable device, and the second terminal is another terminal device, or the second terminal is a wearable device, and the first terminal is another terminal device, a correspondence between the wearable device and another terminal device may be: different subscriber identity module cards using a same number; different terminals using a same number; the wearable device using a universal subscriber identity module card, and another terminal device using an embedded subscriber identity module card; using different numbers; and using two numbers having a binding relationship.

Optionally, the paging position includes at least one of:
a time-domain position, namely, a paging frame (PF);
a time-domain position, namely, a paging occasion (PO); or
a frequency-domain position: a carrier, a bandwidth, or a bandwidth part (BWP) used to transmit the paging message.

Optionally, the second terminal communicates with the network side device through a cellular network, or
the first terminal and the second terminal communicate with each other through a non-cellular network.

Optionally, in a case where the first terminal and the second terminal communicate with each other through a non-cellular network, the apparatus further includes:
a sending module, configured to send the first paging message to the second terminal through the non-cellular network.

When the first terminal receives the first paging message of the network side device, the second terminal may also receive the first paging message of the network side device. In this case, the terminal identifier in the first paging message received by the first terminal may be the same as the terminal identifier in the first paging message received by the second terminal.

The paging terminal identifier may be any one of:
the terminal identifier of the first terminal;
the terminal identifier of the second terminal; or
a primary terminal identifier of the first terminal and the second terminal, where the primary terminal identifier is the terminal identifier of the first terminal, the terminal identifier of the second terminal, or a preset identifier.

To facilitate the network side device in determining the paging position, the terminal identifier of the first terminal and the terminal identifier of the second terminal are a same terminal identifier or similar terminal identifiers assigned by the network side device.

Optionally, there is a binding relationship between the first terminal and the second terminal. In this way, based on the technical solutions of this embodiment, a plurality of terminals having a binding relationship can be paged at the same time. That there is a binding relationship between terminals means that there is a binding relationship between terminal IDs, or there is a binding relationship between subscriber identity module cards (SIM), embedded SIM cards (eSIM), universal subscriber identity module cards (USIM), or corresponding numbers of the terminals.

A paging terminal identifier used by the first terminal to determine the paging position is the same as a paging terminal identifier used by the second terminal to determine the paging position.

Optionally, in a case where the second terminal resides in a cellular network, communicates with a cellular network device, or is in an inactive state in a cellular network, the first terminal is a terminal that is determined by the network side and that receives the first paging message.

Optionally, in a case where the second terminal resides in a cellular network, communicates with a cellular network device, or is in an inactive state in a cellular network, the second terminal does not receive the first paging message or the second terminal receives a second paging message sent by the network side device to the second terminal. For example, the first paging message may carry the terminal identifier of the first terminal and the second paging message may carry the terminal identifier of the second terminal.

Optionally, to accurately page the terminal, before the first terminal receives the paging message sent by the network side device, the sending module is further configured to send paging information of the first terminal and/or paging information of the second terminal to the network side device.

Optionally, the paging information of the first terminal or the paging information of the second terminal includes at least one of:
the terminal identifier of the first terminal;
application layer configuration information of the first terminal;
access stratum configuration information of the first terminal;
the terminal identifier of the second terminal;
application layer configuration information of the second terminal;
access stratum configuration information of the second terminal,
capability information of the first terminal; or
capability information of the second terminal.

Optionally, the application layer configuration information includes an IP layer identifier; and
the access stratum configuration information includes an access network side identifier.

When the first terminal sends the paging information of the second terminal to the network side device, before the first terminal sends the paging information of the second terminal to the network side device, the apparatus further includes:
an obtaining module, configured to obtain the paging information of the second terminal.

Optionally, the obtaining module obtains the paging information of the second terminal through at least one of:
receiving the paging information of the second terminal sent by the second terminal through a non-cellular network; or
receiving the paging information of the second terminal sent by the network side device through a cellular network.

Optionally, the terminal identifier includes some or all bits of at least one of:
an international mobile equipment identity (IMEI);
an international mobile subscriber identity (IMSI);
a SAE-temporary mobile subscriber identity (S-TMSI); or
a radio network temporary identifier (RNTI).

Figure 6:
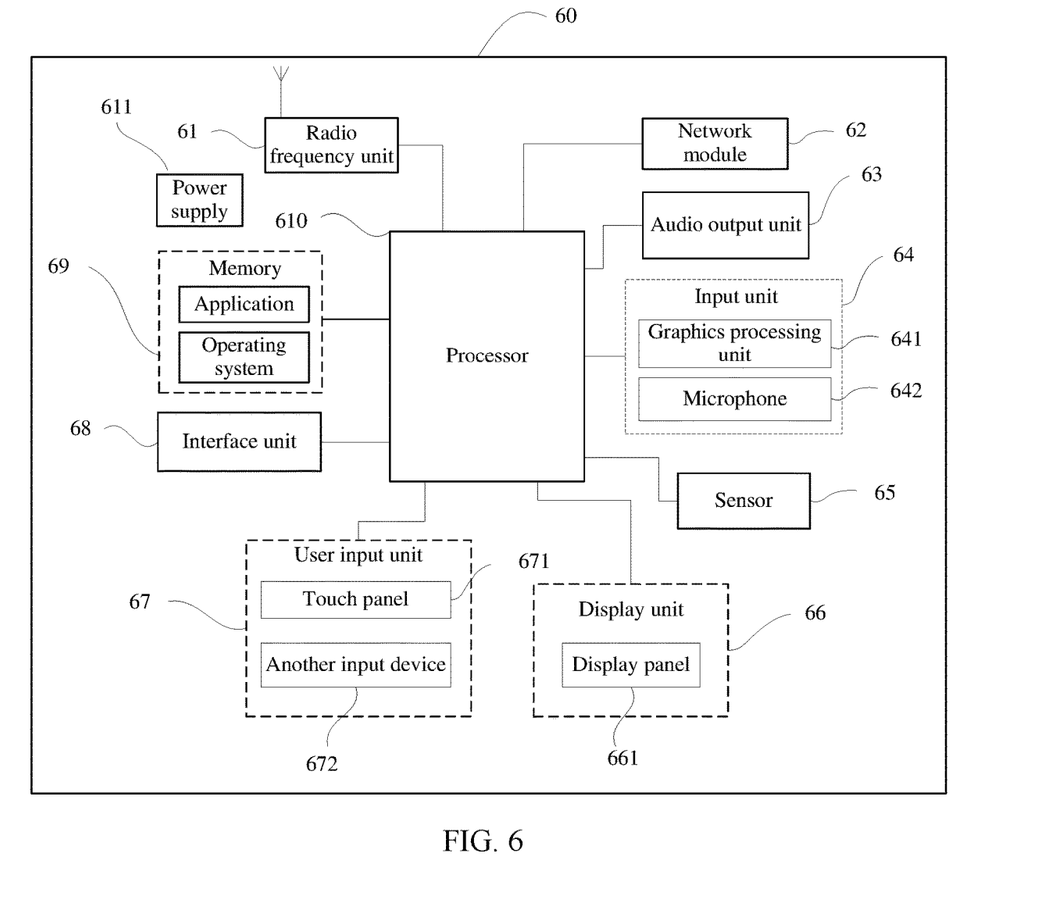
FIG. 6 is a block diagram of a terminal according to an embodiment of the present disclosure.

To better achieve the foregoing objectives, FIG. 6 is a schematic structural diagram of hardware of a terminal for implementing the embodiments of the present disclosure. The terminal 60 includes but is not limited to: a radio frequency unit 61, a network module 62, an audio output unit 63, an input unit 64, a sensor 65, a display unit 66, a user input unit 67, an interface unit 68, a memory 69, a processor 610, a power supply 611, and the like. A person skilled in the art may understand that the structure of the terminal shown in FIG. 6 does not constitute a limitation to the terminal. The terminal may include more or fewer components than those shown in the figure, or some components may be combined, or different component arrangements may be used. In this embodiment of the present disclosure, the terminal includes but is not limited to a mobile phone, a tablet computer, a notebook computer, a palmtop computer, a vehicle-mounted terminal, a wearable device, a pedometer, or the like.

The processor 610 is configured to receive a first paging message sent by a network side device, where the first paging message carries a terminal identifier of the first terminal and/or a terminal identifier of the second terminal, a paging position of the first paging message is determined based on a paging terminal identifier, and the paging terminal identifier is determined based on the first terminal and/or the second terminal.

It should be understood that, in this embodiment of the present disclosure, the radio frequency unit 61 may be configured to receive and send information, or receive and send signals during a call. For example, the radio frequency unit 61 receives downlink data from a base station, and transmits the downlink data to the processor 610 for processing; and transmits uplink data to the base station. Usually, the radio frequency unit 61 includes but is not limited to: an antenna, at least one amplifier, a transceiver, a coupler, a low noise amplifier, and a duplexer. In addition, the radio frequency unit 61 may also communicate with other devices by using a radio communication system and a network.

The terminal provides a user with wireless broadband Internet access by using the network module 62, for example, help the user send and receive emails, browse web pages, and access streaming media.

The audio output unit 63 may convert audio data received by the radio frequency unit 61 or the network module 62 or stored in the memory 69 into an audio signal and output the audio signal as a sound. Moreover, the audio output unit 63 may further provide audio output related to a specific function performed by the terminal 60 (for example, a call signal reception sound, or a message reception sound). The audio output unit 63 includes a loudspeaker, a buzzer, a telephone receiver, and the like.

The input unit 64 is configured to receive an audio or video signal. The input unit 64 may include a graphics processing unit (GPU) 641 and a microphone 642. The graphics processing unit 641 processes image data of a static picture or a video obtained by an image capturing apparatus (such as a camera) in a video capturing mode or an image capturing mode. A processed image frame may be displayed on the display unit 66. The image frame processed by the graphics processing unit 641 may be stored in the memory 69 (or another storage medium) or sent by using the radio frequency unit 61 or the network module 62. The microphone 642 may receive a sound and can process such sound into audio data. The processed audio data can be converted into a format that can be sent to a mobile communications base station through the radio frequency unit 61 in a telephone call mode, for outputting.

The terminal 60 further includes at least one sensor 65, for example, a light sensor, a motion sensor, and another sensor. For example, the light sensor includes an ambient light sensor and a proximity sensor, where the ambient light sensor can adjust brightness of a display panel 661 based on brightness of ambient light, and the proximity sensor can turn off the display panel 661 and/or backlight when the terminal 60 is moved towards the ear. As a type of the motion sensor, an accelerometer sensor may detect an acceleration value in each direction (generally, in three axes), and detect a value and a direction of gravity when the accelerometer sensor is static, and may be used in an application for recognizing a mobile terminal posture (such as screen switching between landscape and portrait modes, a related game, or magnetometer posture calibration), a function related to vibration recognition (such as a pedometer or a knock), and the like. The sensor 65 may further include a fingerprint sensor, a pressure sensor, an iris sensor, a molecular sensor, a gyroscope, a barometer, a hygrometer, a thermometer, an infrared sensor, and the like. Details are not described herein.

The display unit 66 is configured to display information entered by a user or information provided for the user. The display unit 66 may include the display panel 661, and the display panel 661 may be configured in a form of a liquid crystal display (LCD), an organic light-emitting diode (OLED), or the like.

The user input unit 67 may be configured to receive input digital or character information, and generate key signal input related to user setting and function control of the terminal. For example, the user input unit 67 includes a touch panel 671 and another input device 672. The touch panel 671 is also referred to as a touchscreen, and may collect a touch operation performed by a user on or near the touch panel 671 (such as an operation performed by a user on the touch panel 671 or near the touch panel 671 by using any proper object or accessory such as a finger or a stylus). The touch panel 671 may include two parts: a touch detection apparatus and a touch controller. The touch detection apparatus detects a touch position of a user, detects a signal brought by a touch operation, and transmits the signal to the touch controller. The touch controller receives touch information from the touch detection apparatus, converts the touch information into contact coordinates, sends the contact coordinates to the processor 610, and receives and executes a command from the processor 610. In addition, the touch panel 671 may be of a resistive type, a capacitive type, an infrared type, a surface acoustic wave type, or the like. In addition to the touch panel 671, the user input unit 67 may further include another input device 672. For example, the another input device 672 may include but is not limited to: a physical keyboard, a function key (such as a volume control key or a switch key), a trackball, a mouse, and a joystick. Details are not described herein.

Optionally, the touch panel 671 may cover the display panel 661. When detecting a touch operation on or near the touch panel 671, the touch panel 671 transmits the touch operation to the processor 610 to determine a type of a touch event. Then, the processor 610 provides corresponding visual output on the display panel 661 based on the type of the touch event. Although in FIG. 6, the touch panel 671 and the display panel 661 are two independent components to implement input and output functions of the terminal, the touch panel 671 and the display panel 661 may be integrated to implement the input and output functions of the terminal in some embodiments. This is not limited herein.

The interface unit 68 is an interface connecting an external apparatus to the terminal 60. For example, the external apparatus may include a wired or wireless headset port, an external power supply (or a battery charger) port, a wired or wireless data port, a memory card port, a port for connecting an apparatus having an identification module, an audio input/output (I/O) port, a video I/O port, a headset port, and the like. The interface unit 68 may be configured to receive input (for example, data information and power) from the external apparatus and transmit the received input to one or more elements in the terminal 60, or may be configured to transmit data between the terminal 60 and the external apparatus.

The memory 69 may be configured to store a software program and various data. The memory 69 may mainly include a program storage area and a data storage area. The program storage area may store an operating system, an application (such as a sound playing function, or an image playing function) required for at least one function, and the like. The data storage area may store data (such as audio data or an address book) created based on the use of a mobile phone. In addition, the memory 69 may include a high-speed random access memory, and may further include a non-volatile memory such as at least one magnetic disk storage component, a flash memory component, or another volatile solid-state storage component.

The processor 610 is a control center of the terminal, and connects all parts of the entire terminal by using various interfaces and lines. By running or executing a software program and/or a module stored in the memory 69 and invoking data stored in the memory 69, the processor 610 performs various functions of the terminal and data processing, to perform overall monitoring on the terminal. The processor 610 may include one or more processing units. Optionally, the processor 610 may integrate an application processor and a modem processor. The application processor mainly processes an operating system, a user interface, and an application. The modem processor mainly deals with wireless communication. It may be understood that the foregoing modem processor may not be integrated into the processor 610.

The terminal 60 may further include the power supply 611 (for example, a battery) configured to supply power to various components. Optionally, the power supply 611 may be logically connected to the processor 610 through a power management system, so as to implement functions such as managing charging, discharging, and power consumption through the power management system.

In addition, the terminal 60 includes some function modules that are not shown. Details are not described herein.

For example, the terminal in this embodiment of the present disclosure further includes a computer program stored in the memory 69 and executable on the processor 610. When the computer program is executed by the processor 610, the processes in the embodiments of the paging method are implemented, and the same technical effect can be achieved. To avoid repetition, details are not described herein again.

The terminal may be a wireless terminal or a wired terminal. The wireless terminal may be a device providing voice and/or other service data connectivity to a user, a handheld device with a wireless connection function, or another processing device connected to a wireless modem. The wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, the wireless terminal may be a device such as a personal communication service (PCS) phone, a cordless telephone set, a session initiation protocol (SIP) phone, a wireless local loop (WLL) station, or a personal digital assistant (PDA). The wireless terminal may also be referred to as a system, a subscriber unit, a subscriber station, a mobile station, a mobile console, a remote station, a remote terminal, an access terminal, a user terminal, a user agent, or a user device. This is not limited herein.

An embodiment of the present disclosure further provides a non-transitory computer-readable storage medium. The non-transitory computer-readable storage medium stores a computer program, and when the computer program is executed by a processor, the foregoing processes of the photographing method embodiment are implemented, and a same technical effect can be achieved. To avoid repetition, details are not described herein again. The non-transitory computer readable storage medium is, for example, a read-only memory (ROM), a random access memory (RAM), a magnetic disk, or an optical disc.

A person of ordinary skill in the art may be aware that, in combination with the examples described in the embodiments disclosed in this specification, units and algorithm steps may be implemented by using electronic hardware or a combination of computer software and electronic hardware. Whether these functions are performed by using hardware or software depends on a specific application and design constraints of the technical solution. A person skilled in the art may use different methods to implement the described functions for each particular application, but it should not be considered that the implementation goes beyond the scope of the present disclosure.

A person skilled in the art may clearly understand that, for convenient and simple description, for the working processes of the system, apparatus and unit described above, reference may be made to a corresponding process in the foregoing method embodiments, and details are not described herein again.

In the embodiments provided in the present application, it should be understood that the disclosed apparatus and method may be implemented in other manners. For example, the apparatus embodiment described above is only an example. For example, division into the units is only logical function division. There may be other division manners in actual implementation, for example, a plurality of units or components may be combined or integrated into another system, or some features may be ignored or not implemented. In addition, the displayed or discussed mutual couplings or direct couplings or communication connections may be implemented by using some interfaces. The indirect couplings or communication connections between the devices or units may be implemented in electronic, mechanical, or other forms.

The units described as separate components may be or may not be physically separated, and the components displayed as units may be or may not be physical units, that is, may be located in one place or distributed on a plurality of network units. Some or all of the units may be selected according to actual needs to achieve the objective of the solutions of the embodiments.

In addition, function units in the embodiments of the present disclosure may be integrated into one processing unit, or each of the units may exist alone physically, or two or more units are integrated into one unit.

If the function is implemented in the form of software function units and sold or used as independent products, the function may be stored in a non-transitory computer readable storage medium. Based on this understanding, the essence of the technical solutions of the present disclosure, the part contributing to the prior art, or some of the technical solutions may be represented in a form of software product. The computer software product is stored in a storage medium, and include several instructions to enable a computer device (which may be a personal computer, a server, a network device, or the like) to perform all or some of the steps of the method described in various embodiments of the present disclosure. The foregoing storage medium includes: any medium that can store program code, such as a USB flash drive, a removable hard disk, a ROM, a RAM, a magnetic disk, or an optical disc.

In addition, it should be noted that, in the device and method of the present disclosure, obviously, various components or various steps may be decomposed and/or recombined. These decomposition and/or recombination should be regarded as an equivalent solution of the present disclosure. Moreover, the steps for performing the foregoing series of processing may be performed naturally in a chronological order according to a described sequence, but do not necessarily need to be performed in the chronological order, and some steps may be performed in parallel or independently. A person of ordinary skill in the art can understand that all or any step or component of the method and device in the present disclosure may be implemented through hardware, a firmware, software or a combination thereof in any computing apparatus (including a processor, a storage medium and the like). The step and component can be implemented by a person of ordinary skill in the art through basic programming skills after reading the description of the present disclosure.

Therefore, the purpose of the present disclosure may also be implemented through running a program or a group of programs on any computing apparatus. The computing apparatus may be a well-known general-purpose apparatus. Therefore, the objectives of the present disclosure can also be achieved merely by providing a program product including program code for implementing the method or apparatus. In other words, such a program product also constitutes the present disclosure, and a storage medium storing such a program product also constitutes the present disclosure. Obviously, the storage medium may be any well-known storage medium or any storage medium to be developed in the future. It should also be pointed out that, in the apparatus and method of the present disclosure, obviously, various components or steps can be split and/or recombined. These decomposition and/or recombination should be regarded as an equivalent solution of the present disclosure. Moreover, the steps for performing the foregoing series of processing may be performed naturally in a chronological order according to a described sequence, but do not necessarily need to be performed in the chronological order, and some steps may be performed in parallel or independently.

The foregoing descriptions are merely optional implementations of the present disclosure. It should be noted that a person of ordinary skill in the art may further make some improvements and refinements without departing from the principles of the present disclosure, and these improvements and refinements also fall within the protection scope of the present disclosure.

What is claimed is:

1. A paging method, performed by a network side device, used to page a first terminal, and comprising:
   determining a paging position of the first terminal and a second terminal based on a paging terminal identifier, wherein the paging terminal identifier is a terminal identifier of the second terminal; and
   sending, to the first terminal, a paging message at the paging position, wherein the paging message carries the terminal identifier of the second terminal; wherein the paging position comprises at least one of: a paging frame; a paging occasion; or a frequency-domain position.

2. The paging method according to claim 1, wherein
the first terminal resides in a cellular network, or communicates with a cellular network device, or is in an inactive state in a cellular network; and
the first terminal and the second terminal communicate with each other through a non-cellular network.

3. The paging method according to claim 1, wherein there is a binding relationship between the first terminal and the second terminal, and the method further comprises:
obtaining the binding relationship between the first terminal and the second terminal from a core network entity.

4. The paging method according to claim 1, further comprising:
assigning a same terminal identifier or similar terminal identifiers to the first terminal and the second terminal.

5. The paging method according to claim 1, wherein before the sending a paging message, the method further comprises: obtaining at least one of:
paging information of the first terminal; or
paging information of the second terminal.

6. The paging method according to claim 5, wherein the paging information of the first terminal or the paging information of the second terminal comprises at least one of:
the terminal identifier of the first terminal;
application layer configuration information of the first terminal;
access stratum configuration information of the first terminal;
the terminal identifier of the second terminal;
application layer configuration information of the second terminal; or
access stratum configuration information of the second terminal; wherein
the application layer configuration information comprises an internet protocol (IP) layer identifier; and
the access stratum configuration information comprises an access network side identifier.

7. The paging method according to claim 5, wherein the paging information is obtained through at least one of:
receiving the paging information of the first terminal and/or the paging information of the second terminal reported by the first terminal;
receiving the paging information of the first terminal and/or the paging information of the second terminal reported by the second terminal; or
obtaining the paging information of the first terminal and/or the paging information of the second terminal from a core network entity.

8. A paging method, performed by a first terminal, wherein in a case where the first terminal resides in a cellular network, communicates with a cellular network device, or is in an inactive state in a cellular network, the method comprises:
receiving, by the first terminal, a first paging message sent by a network side device, wherein the first paging message carries a terminal identifier of a second terminal, a paging position of the first paging message is determined based on a paging terminal identifier, and the paging terminal identifier is the terminal identifier of the second terminal; wherein the paging position comprises at least one of: a paging frame; a paging occasion; or a frequency-domain position;
wherein in a case where the first terminal and the second terminal communicate with each other through a non-cellular network, the method further includes:
sending, by the first terminal, the first paging message to the second terminal through the non-cellular network.

9. The paging method according to claim 8, wherein there is a binding relationship between the first terminal and the second terminal.

10. The paging method according to claim 9, wherein a paging terminal identifier used by the first terminal to determine the paging position is same as a paging terminal identifier used by the second terminal to determine the paging position.

11. The paging method according to claim 8, wherein before the receiving, by the first terminal, a paging message sent by a network side device, the method further comprises:
sending, by the first terminal, paging information of the first terminal and/or paging information of the second terminal to the network side device.

12. The paging method according to claim 11, further comprising:
sending, by the second terminal, the paging information of the first terminal and/or the paging information of the second terminal to the network side device.

13. The paging method according to claim 12, wherein before the sending, by the first terminal, the paging information of the second terminal to the network side device, the method further comprises:
obtaining, by the first terminal, the paging information of the second terminal.

14. A network side device, used to page a first terminal, wherein the network side device comprises a processor, a memory, and a computer program stored in the memory and executable on the processor, and the computer program, when executed by the processor, causes the network side device to perform:
determining a paging position of the first terminal and a second terminal based on a paging terminal identifier, wherein the paging terminal identifier is a terminal identifier of the second terminal; and
sending, to the first terminal, a paging message at the paging position, wherein the paging message carries the terminal identifier of the second terminal; wherein
the paging position comprises at least one of: a paging frame; a paging occasion; or a frequency-domain position.

15. The paging method according to claim 1, wherein the terminal identifier comprises some or all bits of at least one of following:
an international mobile equipment identity (IMEI);
an international mobile subscriber identity (IMSI);
a temporary mobile subscriber identity (S-TMSI); or
a radio network temporary identifier (RNTI).

16. The paging method according to claim 11, wherein the paging information of the first terminal or the paging information of the second terminal comprises at least one of:
the terminal identifier of the first terminal;
application layer configuration information of the first terminal;
access stratum configuration information of the first terminal;
the terminal identifier of the second terminal;
application layer configuration information of the second terminal; or
access stratum configuration information of the second terminal; wherein
the application layer configuration information comprises an internet protocol (IP) layer identifier; and
the access stratum configuration information comprises an access network side identifier.

17. The paging method according to claim 8, wherein the terminal identifier comprises some or all bits of at least one of following:
- an international mobile equipment identity (IMEI);
- an international mobile subscriber identity (IMSI);
- a temporary mobile subscriber identity (S-TMSI); or
- a radio network temporary identifier (RNTI).

18. The network side device according to claim 14, wherein there is a binding relationship between the first terminal and the second terminal, and the computer program, when executed by the processor, causes the network side device to further perform:
- obtaining the binding relationship between the first terminal and the second terminal from a core network entity.

19. The network side device according to claim 14, wherein the computer program, when executed by the processor, causes the network side device to further perform:
- assigning a same terminal identifier or similar terminal identifiers to the first terminal and the second terminal.

20. The network side device according to claim 14, wherein the computer program, when executed by the processor, causes the network side device to further perform: obtaining at least one of:
- paging information of the first terminal; or
- paging information of the second terminal.

\* \* \* \* \*